United States Patent
Zhang

(10) Patent No.: US 8,027,119 B2
(45) Date of Patent: Sep. 27, 2011

(54) VIBRATION DETECTION AND COMPENSATION FILTER

(75) Inventor: Tao Zhang, Prior Lake, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 11/936,480

(22) Filed: Nov. 7, 2007

(65) Prior Publication Data

US 2009/0116136 A1    May 7, 2009

(51) Int. Cl.
G11B 5/596 (2006.01)
G11B 15/12 (2006.01)

(52) U.S. Cl. ............. 360/77.02; 360/61; 360/77.08; 360/78.04

(58) Field of Classification Search ................. None
See application file for complete search history.

(56) References Cited

U.S. PATENT DOCUMENTS

| | | | |
|---|---|---|---|
| 5,099,367 A | 3/1992 | Sidman | 360/77.05 |
| 5,155,422 A | 10/1992 | Sidman et al. | 318/560 |
| 5,220,468 A | 6/1993 | Sidman | 360/77.05 |
| 5,369,345 A | 11/1994 | Phan et al. | 318/561 |
| 5,404,418 A * | 4/1995 | Nagano | 388/806 |
| 5,608,586 A * | 3/1997 | Sri-Jayantha et al. | 360/77.04 |
| 5,646,797 A | 7/1997 | Kadlec et al. | 360/75 |
| 5,663,847 A * | 9/1997 | Abramovitch | 360/77.02 |
| 5,774,299 A * | 6/1998 | Baum et al. | 360/77.08 |
| 5,828,515 A | 10/1998 | Kim | 360/78.06 |
| 6,417,982 B1 | 7/2002 | Ottesen et al. | 360/77.02 |
| 6,493,172 B1 * | 12/2002 | Morris et al. | 360/77.02 |
| 6,496,320 B1 | 12/2002 | Liu | 360/75 |
| 6,574,065 B1 | 6/2003 | Sir-Jayantha et al. | 360/75 |
| 6,580,579 B1 | 6/2003 | Hsin et al. | 360/77.02 |
| 6,693,764 B1 * | 2/2004 | Sheh et al. | 360/77.08 |
| 6,900,958 B1 * | 5/2005 | Yi et al. | 360/77.02 |
| 7,054,094 B2 | 5/2006 | Zhang et al. | 360/77.02 |
| 7,253,987 B1 * | 8/2007 | Shim et al. | 360/77.02 |
| 7,486,470 B1 * | 2/2009 | Semba | 360/77.01 |
| 2002/0093754 A1 * | 7/2002 | Zhang et al. | 360/77.04 |
| 2003/0161066 A1 * | 8/2003 | Inoue et al. | 360/77.04 |

* cited by examiner

*Primary Examiner* — Andrew L Sniezek
(74) *Attorney, Agent, or Firm* — Alan G. Rego; Westman, Champlin & Kelly, P.A.

(57) ABSTRACT

The application relates to an adaptive vibration damping scheme that provides for detection of, and adjustment for, vibration-related disturbances in devices. The vibration damping scheme utilizes a common filter function to implement vibration detection and vibration compensation.

19 Claims, 5 Drawing Sheets

VIBRATION DETECTION AND COMPENSATION FILTER

FIELD

The present embodiments relate generally to the field of vibration damping and more particularly, but not by way of limitation, to methods and apparatus for vibration detection and compensation in devices.

BACKGROUND

Vibration is a major factor that negatively impacts performance of devices such as computer disc drives. In a computer disc drive, data is stored on discs in concentric tracks. In disc drives with relatively high track densities, a servo feedback loop is used to maintain a head over the desired track during read or write operations. This is accomplished by utilizing prerecorded servo information either on a dedicated servo disc or on sectors that are interspersed along a disc. During track following, the servo information sensed by the head is demodulated to generate a position error signal (PES) which provides an indication of the distance between the head and the track center. The PES is then converted into an actuator control signal, which is used to control an actuator that positions the head.

Misalignment of the read/write heads with respect to the tracks causes increases in read/write errors and a slowdown in read or write operations. Accurate positioning of read/write heads is required even in the presence of anomalies such as aging, temperature changes, changes in orientation of the disc drive, humidity, shock and vibration.

In general, as indicated above, vibration negatively impacts performance of devices with moving parts. The combination of high speed and tight tolerances in disc drives makes them particularly vulnerable to vibration-induced performance degradation.

The present embodiments address these problems and offers other advantages over the prior art.

SUMMARY

An aspect of the disclosure relates to an adaptive vibration damping scheme that utilizes a common filter function for detection of, and compensation for, vibration-related disturbances in devices.

In one apparatus embodiment, a single filter is configured to detect vibration represented in a position error signal (PES) and to generate a compensation signal for the detected vibration.

Another apparatus embodiment is directed to a servo loop. The servo loop includes a vibration detection component without any physical sensor and an adaptive vibration compensation component. The vibration detection component and the vibration compensation component utilize a common filter function to implement vibration detection and vibration compensation.

In one method embodiment, rotational vibration represented in a position error signal is detected using a filter function. The method also involves compensating for the detected rotational vibration and adaptively adjusting a compensation gain utilized along with the filter function to compensate for the detected rotational vibration.

These and various other features and advantages will become apparent upon reading the following detailed description and upon reviewing the associated drawings.

DETAILED DESCRIPTION

Figure 1:
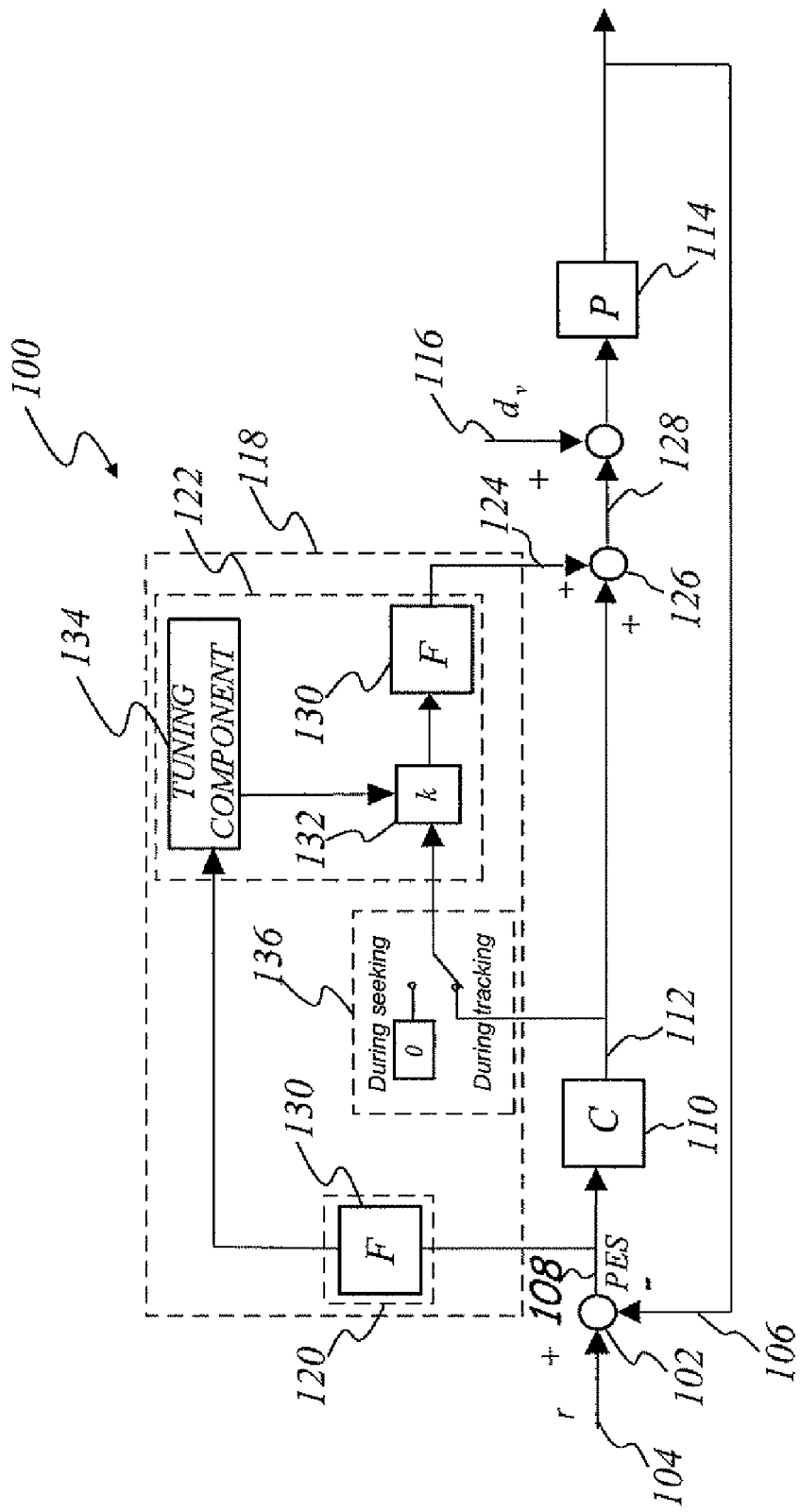
FIG. 1 is a simplified block diagram of a servo loop in accordance with one embodiment.

FIG. 1 is a block diagram of a servo loop 100 in accordance with one of the present embodiments. Because precise structure of the servo loop is not significant to the present embodiments, servo loop 100 is shown in a simplified form. Those skilled in the art will appreciate that servo loops are more complex than the simple diagram of FIG. 1.

The same reference numerals are used in the various figures to represent the same or similar elements. In FIG. 1, servo loop 100 includes a summing node 102 that receives a reference signal (r) 104 that indicates a desired value. Summing node 102 combines reference signal 104 with a servo signal 106, which is a sensed value, to produce a position error signal (PES) 108 that is provided to a controller (C) 110. Controller 110 generates a nominal control signal 112 which, in general, causes plant (P) 114 to move.

In an example embodiment, plant 114 includes a voice coil motor (VCM) that positions a head over a track on a storage medium (for example, a disc storage medium). More specifically, in such an embodiment, using servo patterns stored on the storage medium, the head generates an analog signal that indicates the distance from the head to the track center. The analog signal is converted into digital signal 106 and, as indicated above, digital signal 106 is fed back to summing node 102. Summing node 102 then subtracts digital signal 106 from reference signal 104 to produce PES 108. However, analog control components can be used in alternative embodiments.

As noted earlier, vibration is a major factor that negatively impacts performance of devices such as disc drives. In FIG. 1, vibration-related disturbances, which include rotational vibration disturbances, are shown separately as disturbance ($d_v$) 116.

In general, one or more of the present embodiments relate to adaptive vibration damping schemes that provide for detection of, and adjustment for, vibration-related disturbances in devices.

Accordingly, in the example embodiment shown in FIG. 1, servo loop 100 includes a vibration damping circuit 118 which, in turn, includes, as its primary components, a vibration detection component 120, and an adaptive vibration compensation component 122. In essence, vibration detection component 120 detects vibration represented in PES 108 and provides an output indicative of the detected vibration to adaptive vibration compensation circuit 122, which responsively adjusts at least one of its parameters to provide a suitable vibration compensation signal 124. As can be seen in FIG. 1, both nominal control signal 112 and vibration compensation signal 124 are provided to summing node 126, which outputs servo control signal 128. Servo control signal 128 is essentially a refined version of nominal control signal 112.

In at least some of the present embodiments, both vibration detection component 120 and vibration compensation component 122 utilize a common filter function (or single filter)

(F) 130 to implement vibration detection and vibration compensation. As used herein, a common filter function or single filter is either a single software, hardware or firmware component that is utilized, called, or invoked to carry out vibration detection and compensation functions, or two substantially similar copies of software, hardware or firmware components that are utilized, called, or invoked to carry out vibration detection and compensation functions. In a specific embodiment, filter 130 is a band-pass filter that detects PES degradation due to low frequency vibration, which primarily includes rotational vibration.

As can be seen in FIG. 1, adaptive vibration compensation component 122 also includes an adjustable compensation gain (k) 132, which is utilized with filter 130 to generate vibration compensation signal 124. A tuning component 134 adjusts compensation gain 132 based on the detected vibration. Specific examples of filter 130 and tuning component 134 are described further below.

As noted earlier, in general, in a disc drive, PES 108 is generated during a track following operation. Before the track following operation, a seek operation is carried out to arrive at the track (or to bring the head to the desired track). In one embodiment, vibration damping circuit 118 includes a control input enable/disable component 136 that is configured to disable provision of nominal control signal 112 to filter 130 via component 132 during a seek operation, and to enable provision of signal 112 to filter 130 during a track following operation. Component 136 is discussed again further below in connection with a specific embodiment. It should be noted that, in at least some of the present embodiments, vibration detection is carried out without using any physical sensor.

As indicated above, in some embodiments, vibration detection filter 130 detects/monitors vibration-related disturbance in servo loop 100 by low frequency filtering of PES 108. In a specific embodiment, vibration detection filter 130 is designed as follows:

$$F(s) = \frac{as}{s^2 + bws + w^2} \qquad \text{Equation 1}$$

where w=2*pi*f with frequency f being a rotational vibration frequency; b is a damping ratio that controls the bandwidth of the filter. By suitably selecting parameters a, b and f, a band-pass filter F(s) that detects PES degradation due to low frequency vibration is designed for implementation.

A rotational vibration compensation signal (for example, a rotational vibration compensation current) is generated based on the controller output 112 and compensation gain (k) 132. A specific self-tuning law that can be implemented in tuning component 134 to suitably adjust compensation gain 132 based on detected vibration is as follows:

$$k(t) = c0*k(t-1) + c1*|PES_{rv}| \qquad \text{Equation 2}$$

where 0<c0<1 and c1>0 are constants that adjust a speed of adaptation. When there is little or no low frequency vibration disturbance, $PES_{rv}$ (low frequency filtered PES or rotational vibration filtered PES) becomes small. This results in a decrease in gain k(t) of the rotational vibration compensation. This means that the adaptive vibration damping circuit has little impact on the overall servo loop when there is little or no vibration. In the case of a disc drive in a high rotational disturbance environment, the disturbance detection filter F(s) will generate large $PES_{rv}$, which increases rotational vibration compensation gain k(t) relatively rapidly. In this case, a large rotational vibration compensation current is generated and applied to the VCM for disturbance rejection.

As noted earlier, one aspect of the adaptive vibration damping circuit is that the input of the nominal control signal 112 to compensation filter (F) 130 is disabled (for example, set to zero), with the help of component 136, during a seek operation. This helps remove a poor transient response of the adaptive vibration damping circuit during seeking/settling operations.

Figure 2:
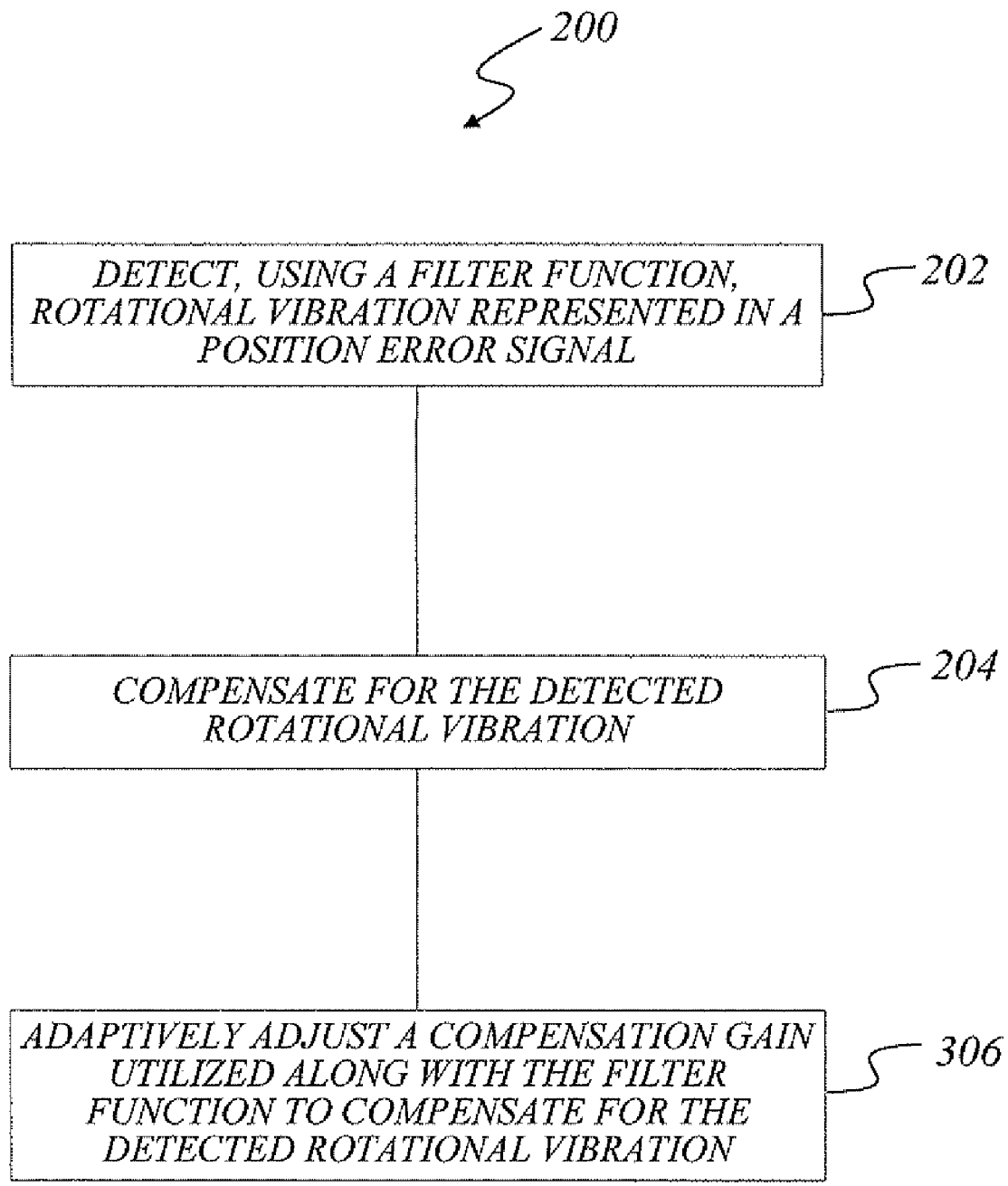
FIG. 2 is a flowchart of a method embodiment.

Referring now to FIG. 2, a flowchart 200 of a vibration damping method is shown. A first step of the method involves detecting, using a filter function, rotational vibration represented in a PES. This is illustrated at step 202. Step 204 involves compensating for the detected rotational vibration. At step 206, a compensation gain utilized along with the filter function to compensate for the detected rotational vibration is adaptively adjusted. Different techniques, some of which are set forth above, can be employed to carry out the steps shown in the flowchart of FIG. 2 while maintaining substantially the same functionality without departing from the scope and spirit of the present disclosure.

Figure 3:
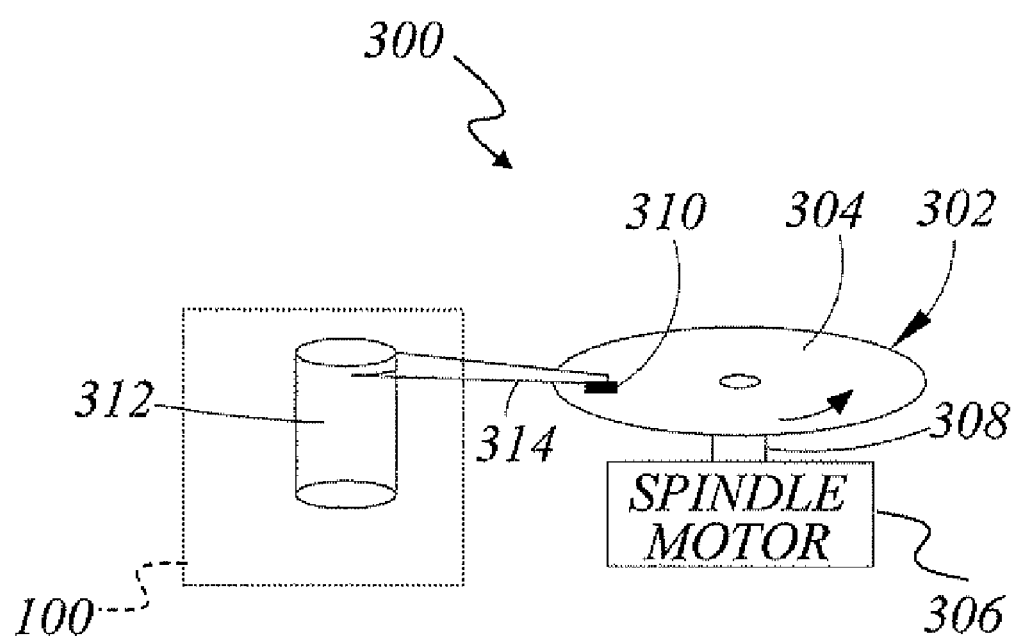
FIG. 3 is a simplified block diagram of a data storage device in which at least some of the present embodiments are useful.

FIG. 3 is a simplified block of an exemplary device in which the earlier-described methods and apparatus for vibration detection and compensation are useful. In this example, the device 300 includes a rotatable storage medium 302 having a data surface 304. However, embodiments of the present disclosure are useful in other data storage and non-data storage applications.

Storage medium 302 is coupled to a spindle motor 306 through a spindle 308. A transducing head 310 is positioned relative to surface 304 for reading and writing information onto surface 304. Transducer 310 is coupled to an actuator 312 through an actuator arm 314. In general, transducer 310 can read and write information on a desired location on surface 304 by moving transducer 310 with actuator 312 in a manner to position transducer 310 radially while storage medium 302 rotates. In a specific embodiment, data is stored on surface 304 in concentric tracks and a servo feedback loop 100, which is shown in detail in FIG. 1, is used to maintain head 310 over the desired track during read or write operations. This is accomplished by utilizing prerecorded servo information on sectors that are interspersed along surface 304, for example. During track following, the servo information sensed by the head 310 is demodulated to generate a PES (such as 108 of FIG. 1) which provides an indication of the distance between the head 310 and the track center. The PES is then converted into an actuator control signal, which is used to control actuator 312 that positions the head 310.

Figure 4A:
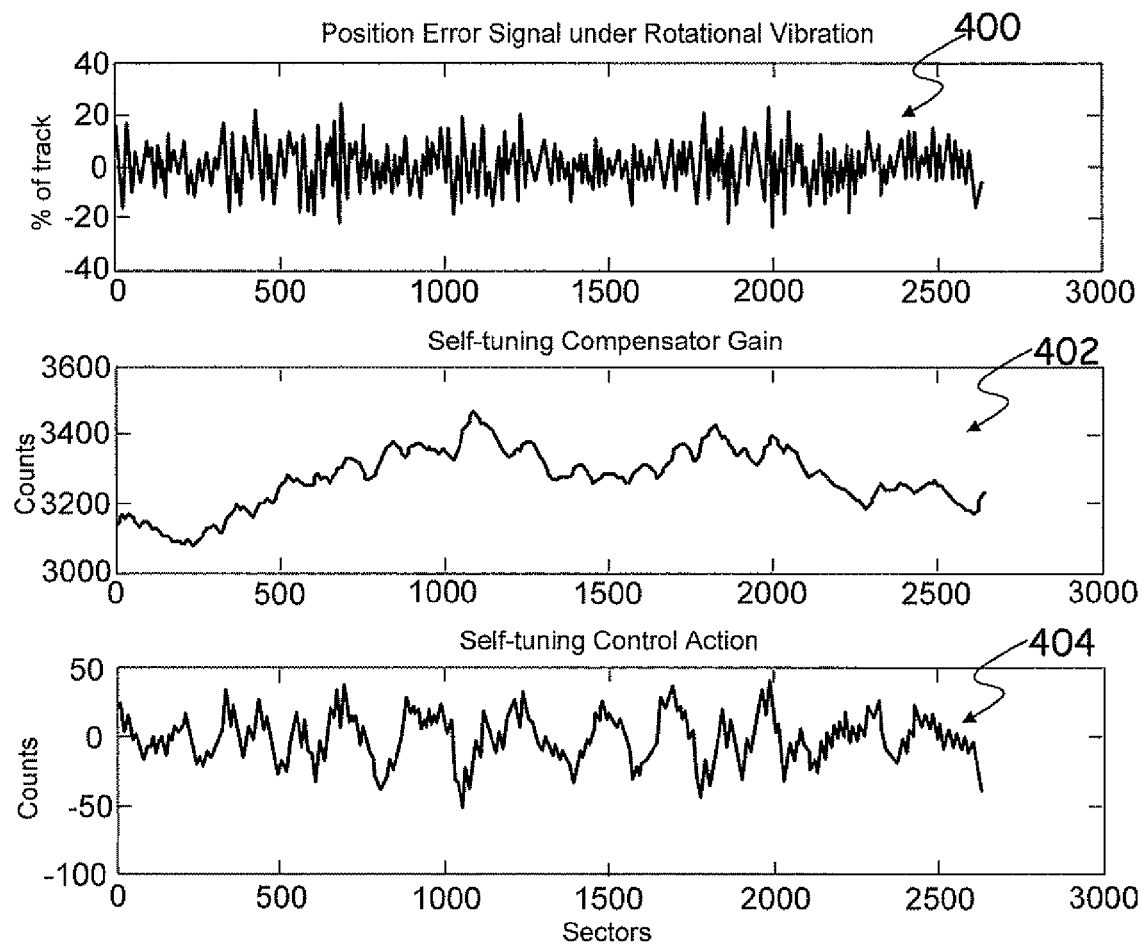
FIGS. 4A and 4B are plots illustrating signals generated by components of the present embodiments.

FIG. 4A is a plot showing signals received at, and generated by, different components of a servo loop (such as 100) included in a device 300, when the device is subject to rotational vibration. Plot 400 shows PES 108 measured at each sector of a rotatable storage medium as it rotates. As explained earlier in connection with FIG. 1, filter 130 in vibration component 120 detects vibration represented in PES 108 and provides an output indicative of the detected vibration to tuning component 134, which responsively adjusts compensation gain (k) 132. Adjusted compensation gain values at each sector form plot 402. The compensation gain values are utilized along with filter 130 in component 122 to generate vibration compensation signal 124. Plot 404 shows vibration compensation signal values for the sectors of the storage medium during a revolution of the medium.

Figure 4B:
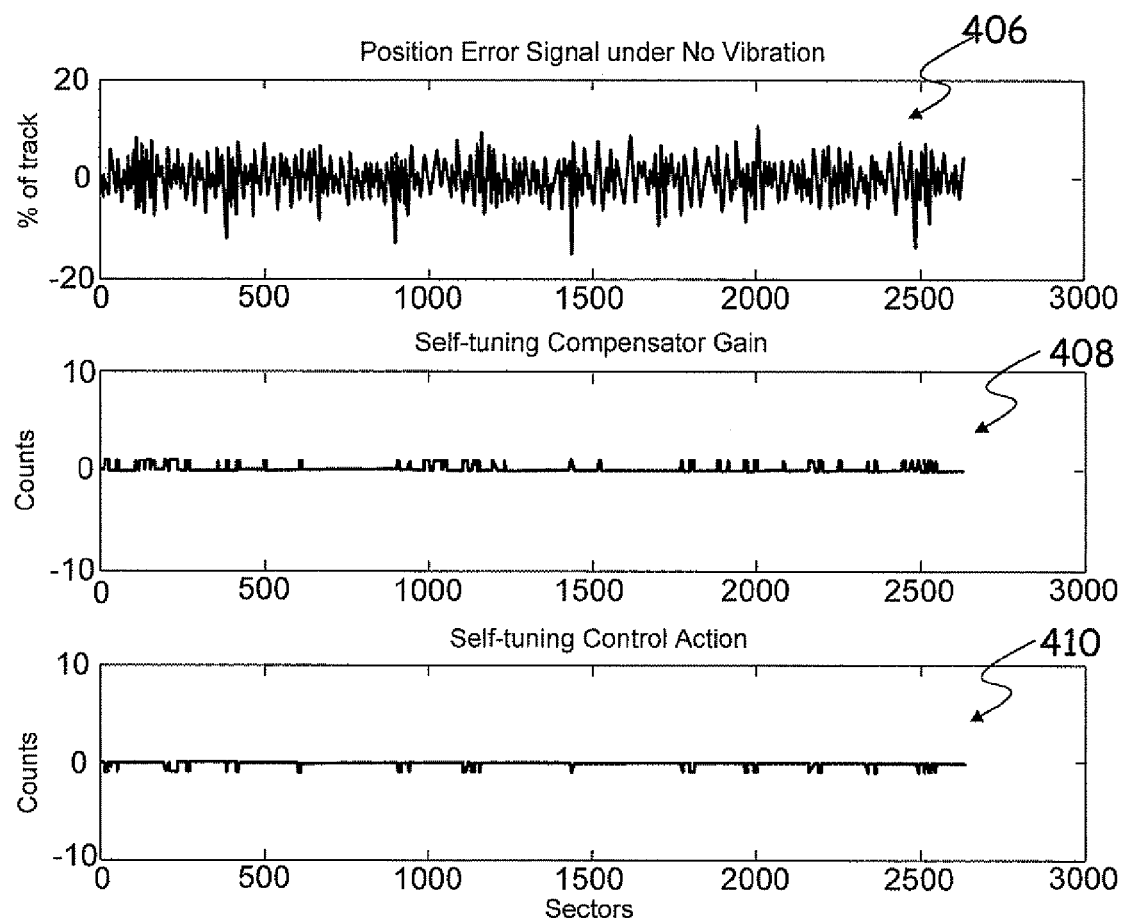

FIG. 4B includes graphs similar to those in FIG. 4A. However, the plots in FIG. 4B illustrate operation of components of servo loop 100 in the absence of rotational vibration in device 300. Thus, plot 406 shows PES without rotational vibration, and plots 408 and 410 demonstrate that adaptive vibration compensation component 122 essentially automatically "shuts off" in the absence of rotational vibration.

It is to be understood that even though numerous characteristics and advantages of various embodiments have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. For example, the particular elements may vary depending on the particular vibration-susceptible environment without departing from the spirit and scope of the present disclosure.

What is claimed is:

1. An apparatus comprising:
    a single filter configured to detect vibration represented in a position error signal (PES) by directly filtering the PES and to provide an output indicative of the detected vibration to an adaptive vibration compensation component,
    wherein the adaptive vibration compensation component, in response to receiving the output indicative of the detected vibration, utilizes the same single filter to generate a compensation signal for the detected vibration.

2. The apparatus of claim 1 wherein the single filter is a band-pass filter that detects PES degradation due to low frequency vibration.

3. The apparatus of claim 1 and further comprising an adjustable compensation gain that is utilized with the single filter to generate a compensation signal for the detected vibration.

4. The apparatus of claim 3 and further comprising a tuning component that is configured to adjust the compensation gain based on the detected vibration.

5. The apparatus of claim 4 and further comprising a control input enable/disable component that is configured to selectively enable and disable provision of a nominal control signal to the single filter.

6. The apparatus of claim 5 and wherein the control input enable/disable component is configured to disable provision of the nominal control signal to the single filter during a seek operation.

7. The apparatus of claim 5 and wherein the control input enable/disable component is configured to enable provision of the nominal control signal to the single filter during a track following operation.

8. A method comprising:
    detecting, using a filter function, vibration represented in a position error signal (PES) by directly filtering the PES;
    providing an output indicative of the detected vibration in the PES;
    compensating for the detected vibration by, in response to receiving the output indicative of the detected vibration in the PES, generating a compensation signal for the detected vibration using the same filter function and by adjusting a compensation gain.

9. The method of claim 8 and further comprising selectively enabling and disabling provision of a nominal control signal to the filter function.

10. The method of claim 9 wherein selectively enabling and disabling provision of a nominal control signal to the filter function comprises disabling provision of a nominal control signal to the filter function during a seek operation.

11. The method of claim 9 wherein selectively enabling and disabling provision of a nominal control signal to the filter function comprises enabling provision of a nominal control signal to the filter function during a track following operation.

12. The method of claim 8 wherein detecting, using a filter function, vibration represented in a position error signal comprises detecting PES degradation due to low frequency vibration.

13. A servo loop comprising:
    a vibration detection component without any physical sensor; and
    an adaptive vibration compensation component;
    wherein the vibration detection component and the vibration compensation component utilize a same filter function that is applied within the vibration detection component to detect vibration in a position error signal (PES) by directly filtering the PES and to provide a vibration detection output, and is also applied within the vibration compensation component to compensate for the detected vibration by generating a compensation signal for the detected vibration in response to receiving the vibration detection output.

14. The servo loop of claim 13 wherein the same filter function comprises a rotational vibration detection filter.

15. The servo loop of claim 13 wherein the adaptive vibration compensation component comprises an adjustable compensation gain.

16. The servo loop of claim 15 and further comprising a tuning component that is configured to adjust the compensation gain based on detected vibration.

17. The servo loop of claim 13 and further comprising a control input enable/disable component that is configured to selectively enable and disable provision of a nominal control signal to the same filter function.

18. The servo loop of claim 17 and wherein the control input enable/disable component is configured to disable provision of the nominal control signal to the same filter function during a seek operation.

19. The servo loop of claim 17 and wherein the control input enable/disable component is configured to enable provision of the nominal control signal to the same filter function during a track following operation.

* * * * *